United States Patent [19]

Dupuy et al.

[11] Patent Number: 6,031,829
[45] Date of Patent: Feb. 29, 2000

[54] BASE TRANSCEIVER STATION FOR CELLULAR MOBILE RADIO SYSTEM AND SYSTEM FOR SYNCHRONIZING SUCH BASE TRANSCEIVER STATIONS

[75] Inventors: Pierre Dupuy, Paris; Corinne Cherpantier, Garches; Max Dobrosielski, Cergy St Christophe, all of France

[73] Assignee: Alcatel Cit, Paris, France

[21] Appl. No.: 08/721,583

[22] Filed: Sep. 25, 1996

[30] Foreign Application Priority Data

Sep. 26, 1995 [FR] France .................................. 95 11266

[51] Int. Cl.$^7$ .............................. H04B 7/212; H04J 3/00
[52] U.S. Cl. ............................................ 370/337; 375/202
[58] Field of Search ..................................... 375/202, 203, 375/362, 367, 371, 200; 370/320, 321, 335, 342, 441, 479, 337, 350, 347, 348, 442; 455/442, 447, 507

[56] References Cited

U.S. PATENT DOCUMENTS

| | | | |
|---|---|---|---|
| 5,394,433 | 2/1995 | Bantz et al. ........................... | 375/202 |
| 5,414,731 | 5/1995 | Antunes et al. ....................... | 375/202 |
| 5,506,863 | 4/1996 | Meidan et al. ........................ | 375/202 |
| 5,619,493 | 4/1997 | Ritz et al. ............................. | 370/330 |
| 5,627,880 | 5/1997 | Rozanski et al. ..................... | 379/59 |
| 5,638,361 | 6/1997 | Ohlson et al. ........................ | 375/202 |

FOREIGN PATENT DOCUMENTS

| | | |
|---|---|---|
| 0629056A1 | 12/1994 | European Pat. Off. . |
| WO8606571 | 11/1986 | WIPO . |
| WO9410768 | 5/1994 | WIPO . |
| WO9418764 | 8/1994 | WIPO . |
| WO9502306 | 1/1995 | WIPO . |
| 0645903A1 | 3/1995 | WIPO . |

*Primary Examiner*—Jason Chan
*Assistant Examiner*—Jean B. Corrielus
*Attorney, Agent, or Firm*—Sughrue, Mion, Zinn, Macpeak & Seas, PLLC

[57] ABSTRACT

In a TDMA type cellular mobile radio system frequencies are shared between cells of the same re-use pattern and frequency hopping is used so that the frequency used at any time in one of the cells of a re-use pattern is different from those used at the same time in the other cells of that pattern. A base transceiver station of this system commands the sending of one of the frequencies shared in this way during a part of the time division multiple access frame and commands the stopping of all sending during the other part of the frame. This other part of the frame has a duration at least equal to the relative synchronization error between base transceiver stations of the system

4 Claims, 4 Drawing Sheets

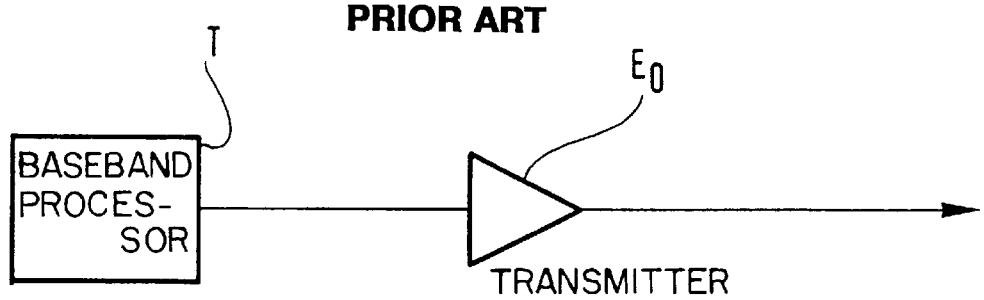
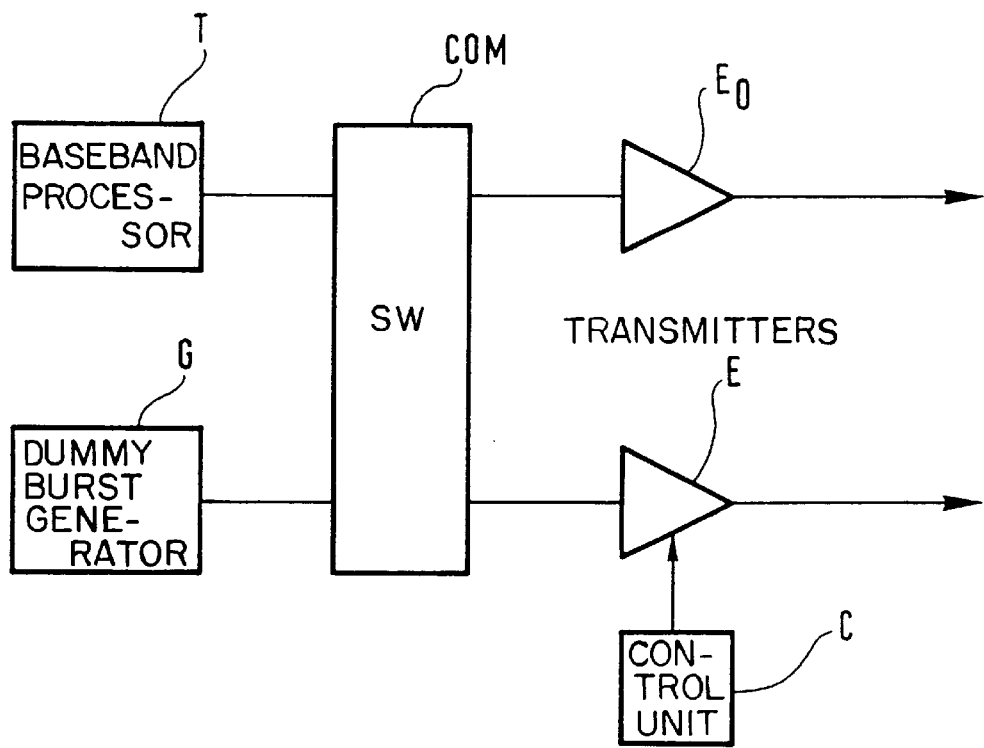

BASE TRANSCEIVER STATION FOR CELLULAR MOBILE RADIO SYSTEM AND SYSTEM FOR SYNCHRONIZING SUCH BASE TRANSCEIVER STATIONS

BACKGROUND OF THE INVENTION

1. Field of the Invention

The present invention concerns cellular mobile radio systems.

The present invention is applicable to cellular mobile radio systems including cells of low capacity (for example microcells), for example.

Accordingly, in a time division multiple access system such as the GSM system, for example, the present invention applies to cells with a capacity limited to eight channels, i.e. seven dedicated channels plus one common channel, for example.

2. Description of the Prior Art

The architecture of a fixed station, or base transceiver station, for a cell of this kind in the GSM system is shown in FIG. 1 and the principle of sending by a base transceiver station of this kind is shown in FIG. 2.

In the GSM system the time division multiple access temporal structure is made up of repetitive frames each including eight time slots $IT_0$ through $IT_7$.

In addition to traffic data relating to said dedicated channels, a base transceiver station in the GSM system must send control data relating to said common channel in a particular time slot (in this instance the first time slot $IT_0$) of a frame structure transmitted on a frequency called the BCCH frequency.

The base transceiver station shown in FIG. 1 therefore includes a transmitter $E_0$ sending a frequency $f_0$ (constituting the BCCH frequency) receiving the data to be sent in the various time slots of said time structure, this data being originated by baseband processing means T (encoding and conversion to the GSM system transmission format).

This data includes, in this instance:

data forming a common channel $CH_0$ conveyed by the time slot $IT_0$, as shown in FIG. 2, data forming dedicated channels $CH_1$ through $CH_7$ respectively conveyed by the time slots $IT_1$ through $IT_7$, as shown in FIG. 2.

Mobile radio systems use the technique known as frequency hopping which improves transmission quality in the presence of the phenomenon of fading, for example.

This technique requires a minimum set of spectral resources, however; for example, it is not applicable to the base transceiver stations of the type shown in FIG. 1, since these base transceiver stations have only one carrier frequency.

Document WO 91/13502 discloses pooling frequencies allocated to different cells of the same re-use pattern of a cellular system for frequency hopping so that the frequency used during a time slot in one cell of the re-use pattern is different from those used in the same time slot in the other cells of the re-use pattern.

In the above document, it is assumed that no overlapping occurs that could produce interference.

However, this application proceeds from the position that this assumption cannot be made, i.e. that the various base transceiver stations of the system cannot be perfectly synchronized, but nevertheless aims to avoid any such risk of interference.

SUMMARY OF THE INVENTION

Accordingly, the present invention consists in a base transceiver station for time division multiple access type cellular mobile radio systems in which frequencies are shared between cells of the same re-use pattern and which use frequency hopping so that the frequency used at any time in one of the cells of a re-use pattern is different from those used at the same time in the other cells of that pattern, including means for commanding the sending of one of the frequencies shared in this way during a part of the time division multiple access frame and for commanding the stopping of all sending during the other part of the frame, this other part of the frame having a duration at least equal to the relative synchronization error between base transceiver stations of the system.

Another aim of the present invention is to solve the previously stated problem of modifying as little as possible the architecture of the base transceiver stations compared to their current architecture as shown in FIG. 1, without losing capacity relative to that current architecture.

Accordingly, in accordance with another feature of the invention, said part of the frame having a duration at least equal to the relative synchronization error between base transceiver stations is the first time slot ($IT_0$) of that frame.

Moreover, in the application to the GSM system referred to above, in which said frame part of duration at least equal to the relative synchronization error between base transceiver stations consists of the first time slot ($IT_0$) of that frame, some synchronization of the base transceiver stations of the system is nevertheless needed; for example, a maximal synchronization error equal to half a time slot might be tolerable.

A method of synchronizing base transceiver stations for a cellular mobile radio system in which the clocks of the base transceiver stations have the same frequency but any relative phase is disclosed in document EP-0 626 769. In this method:

different base transceiver stations receive the same time reference signal from a switching center over different wired links, one of these base transceiver stations is a reference base transceiver station, the others being subordinate base transceiver stations, each subordinate base transceiver station listens to a mobile station communicating with the reference base transceiver station, each subordinate base transceiver station detects a time shift between the time reference signal as received from the switching center and the signal received from the mobile station, and applies a correction to compensate this time shift and therefore to synchronize to the reference base transceiver station.

One particular drawback of a method of this kind is that it requires the subordinate base transceiver stations to listen to mobile stations with which they are not communicating.

Another object of the present invention is to avoid this drawback.

Accordingly, the present invention also consists in a system for synchronizing cellular mobile radio system base transceiver stations wherein the clocks of said base transceiver stations have equal frequencies but can have any relative phase, said system including means enabling a reference base transceiver station to impose its timing reference on another, subordinate base transceiver station in order to compensate a phase difference between the two stations, wherein said means include:

means enabling a mobile station to listen to said reference base transceiver station and said subordinate base transceiver station, means for deducing the time shift $D_1$ between said two base transceiver stations as seen from said mobile station, means for determining the propagation time difference $D_2$ between the mobile station and each of said base transceiver stations on the occasion of a handover involving said reference base transceiver station and said subordinate base transceiver station, and means for determining, from the values $D_1$ and $D_2$, a time shift to be corrected in order to synchronize said subordinate base transceiver stations to said reference transceiver station.

Other objects and features of the present invention will emerge from a reading of the following description of one embodiment, this description referring by way of example to the previously mentioned application to the GSM system and being given with reference to the accompanying drawings.

BRIEF DESCRIPTION OF THE DRAWINGS

FIG. 1, described above, shows the prior art architecture of a base transceiver station previously referred to.

FIG. 4 is a block diagram of a base transceiver station of the invention.

DETAILED DESCRIPTION OF THE PREFERRED EMBODIMENT

Figure 2:
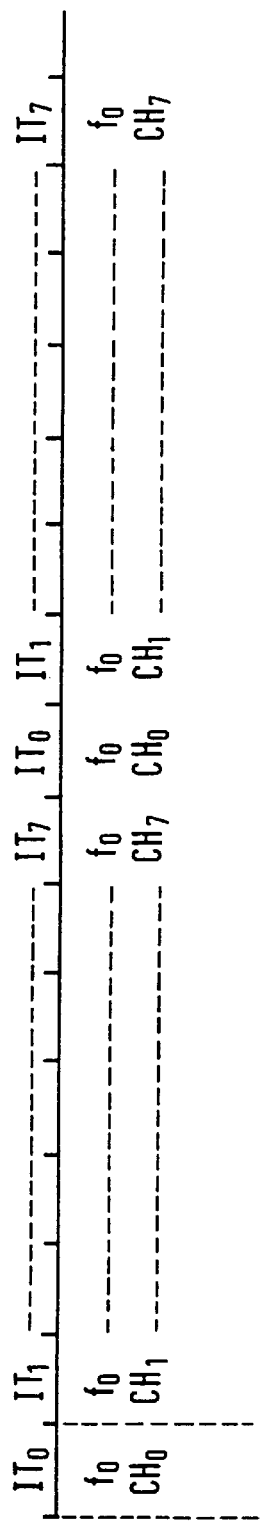
FIG. 2 shows the principle of sending by a base transceiver station as shown in FIG. 1.
Figure 3:
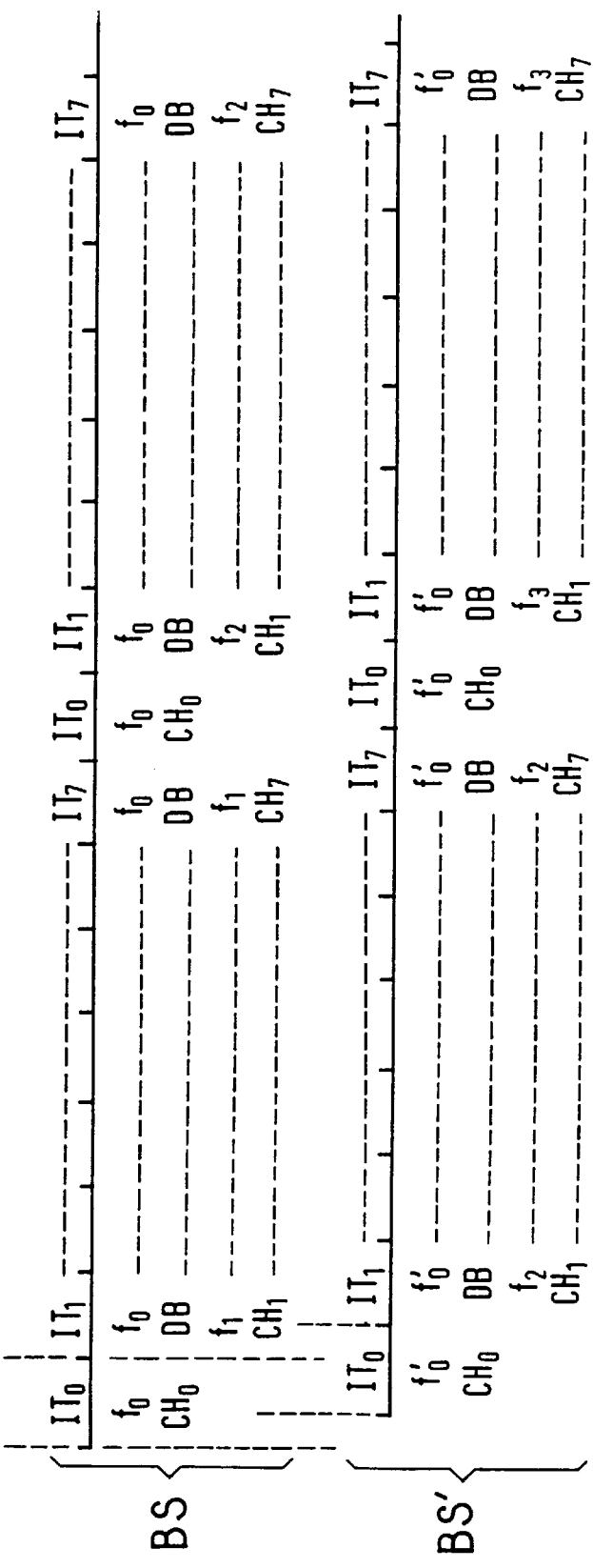
FIG. 3 shows the principle of sending by base transceiver stations of the invention.

FIG. 3 shows the principle of sending, in accordance with the invention, by base transceiver stations in the same re-use pattern, for example two base transceiver stations BS and BS'.

The time structure used for sending by each of these base transceiver stations is shown. As in FIG. 1, the time slots $IT_0$ through $IT_7$ of two consecutive frames are shown, by way of example.

Note that the base transceiver stations BS and BS' are not perfectly synchronized and that the relative synchronization error is in this instance in the order of half a time slot.

The BCCH frequency on which each base transceiver station sends is also shown, in this instance $f_0$ for the base transceiver station BS and $f'_0$ for the base transceiver station BS'.

As shown in FIG. 3, the common channel $CH_0$ for each base transceiver station is sent during time slots $IT_0$ on the BCCH frequency of that base transceiver station and dummy bursts DB (padding data) are sent during the time slots $IT_1$ through $IT_7$ on the BCCH frequency of each base transceiver station.

FIG. 3 also shows the frequency at which the dedicated channels $CH_1$ through $CH_7$ are sent by each base transceiver station.

In this example, for each base transceiver station the frequency for sending the dedicated channels, chosen from the set of frequencies shared by the various cells of the re-use pattern concerned, changes from frame to frame and for each frame remains unchanged during the time slots $IT_1$ through $IT_7$, no sending taking place during the time slots $IT_0$.

For example, the sending frequency changes from $f_1$ to $f_2$ for the base transceiver station BS and from $f_2$ to $f_3$ for the base transceiver station BS' from one of the two frames shown to the other.

The fact that the two base transceiver stations concerned are not perfectly synchronized with each other does not generate interference here, as would have been the case for the frequency $f_2$ in the example shown, since no sending takes place during the time slot $IT_0$.

Also, there is no loss of capacity for the base transceiver stations relative to the situation shown in FIG. 1, since the time slot $IT_0$ is lost to traffic in any event.

The modifications required relative to the architecture shown in FIG. 1 are reduced since the baseband processing means T can be the same.

FIG. 4 shows one example of the architecture of a base transceiver station of the invention.

Compared to that shown in FIG. 1, this base transceiver station includes additional sending means which, in the example shown, consist in a transmitter E controlled by control means C.

The commands that the transmitter E receives from the control means C include, in this example, a command to stop sending during the time slots $IT_0$ of the frame structure, as explained with reference to FIG. 3. More generally, to achieve the desired effect, namely to avoid interference, this command to stop sending would be executed for a time period at least equal to the relative synchronization error between the base transceiver stations of the system concerned.

Means G are also provided for generating dummy bursts to be sent during time slots $IT_1$ through $IT_7$ of the frame structure carried by the BCCH frequency.

The data from the baseband processing means T and from the means G for generating dummy bursts is routed to the transmitters $E_0$ and E by switching means COM in accordance with the principle described above and shown in FIG. 3.

Although the foregoing description corresponds more particularly to the case of cells with a capacity limited to eight channels (seven dedicated channels plus one common channel), by way of example, the invention is not limited to an application of this kind.

Figure 5:
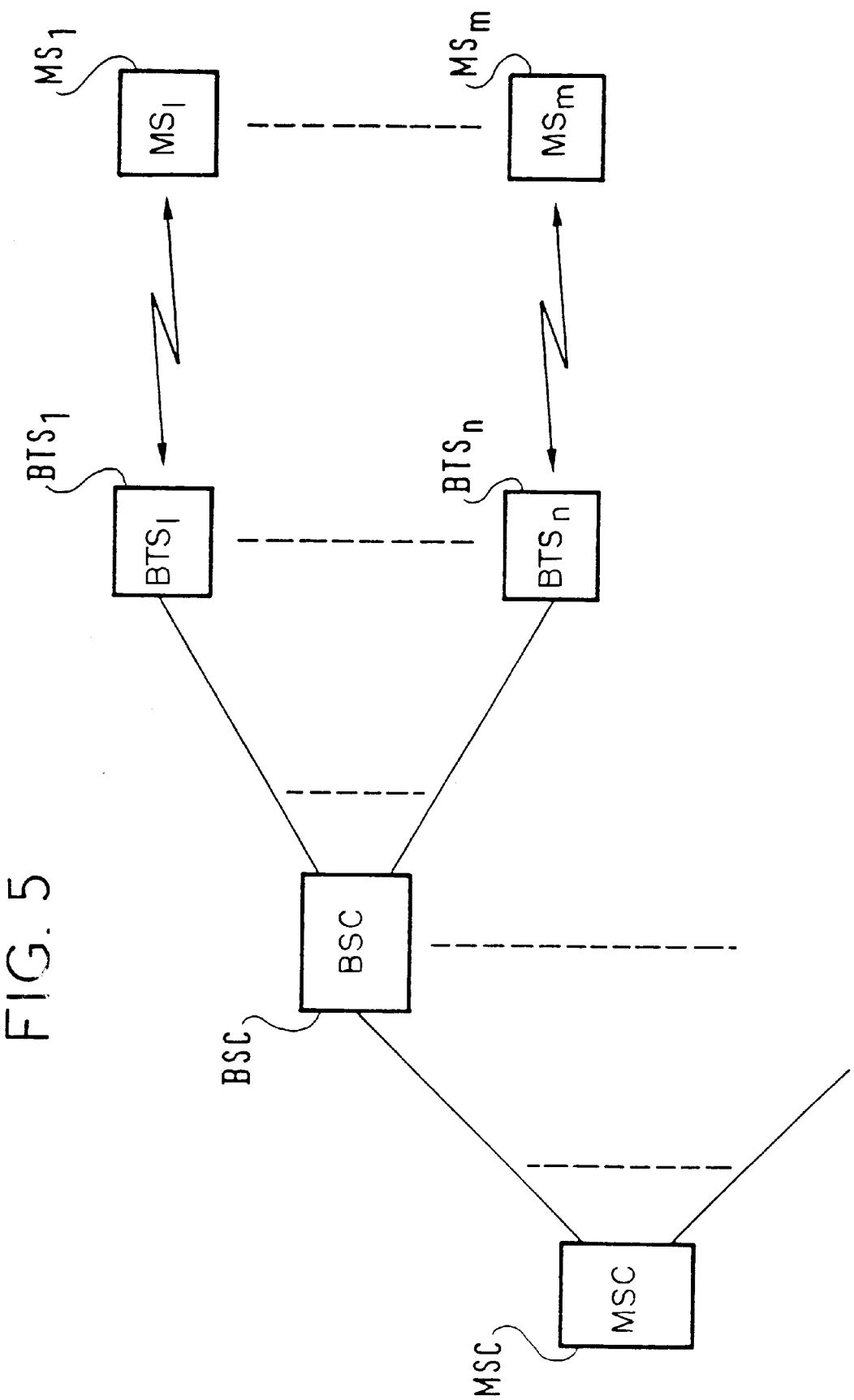
FIG. 5 shows the general architecture of a cellular mobile radio system such as the GSM system, for example.

There will now be described one embodiment of a base transceiver station synchronization system of the invention, starting with an outline description of the general architecture of a cellular mobile radio system such as the GSM system, for example, given with reference to FIG. 5.

Each cell is equipped with a transmitter-receiver station $BTS_1$ through $BST_n$ called the base transceiver station.

Each base transceiver station can be connected by a radio link to a mobile station $MS_1$ through $MS_m$ for the purposes of a call involving that mobile station.

A set of base transceiver stations $BTS_1$ through $BTS_n$ is also connected by cable to a base transceiver station controller BSC and a set of base transceiver station controllers BSC is connected to a mobile services switching center MSC, the combination of the MSC and the BSC handling call management, for example management of the signalling relating to calls.

The base transceiver stations are rendered plesiochronous through the intermediary of the mobile services switching center MSC connected to the cable telephone network. The clocks of the base transceiver stations therefore have the same frequency but can have any relative phase.

Means are additionally provided to enable a reference base transceiver station to impose its timing reference on another base transceiver station, called the subordinate base transceiver station, in order to compensate the phase difference.

Figure 6:
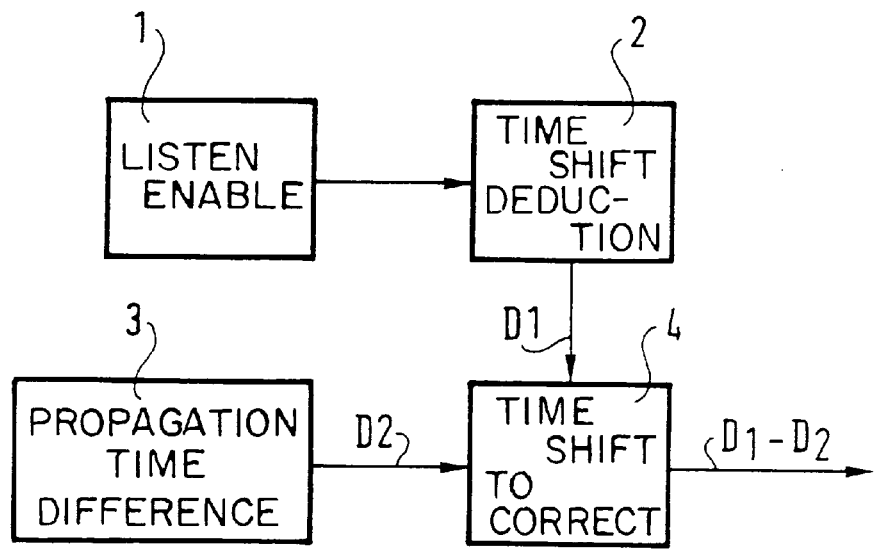
FIG. 6 is a block diagram showing the means employed in a mobile station in one embodiment of a base transceiver station synchronization system of the invention.

In accordance with the invention, and as shown in FIG. 6, these means comprise:
- means 1 enabling a mobile station to listen to said reference base transceiver station and said subordinate base transceiver station,
- means 2 for deducing the time shift $D_1$ between those two base transceiver stations, as seen from the mobile station,
- means 3 for determining, on the occasion of a change of cell (or "handover") involving said reference base transceiver station and said subordinate base transceiver station, the propagation time difference $D_2$ between the mobile station and each of the base transceiver stations,
- means 4 for determining from the values $D_1$ and $D_2$ the time shift to be corrected in order to synchronize the subordinate base transceiver station to the reference base transceiver station.

The means 1 enabling a mobile station to listen to a base transceiver station (reference or subordinate) are conventionally provided in a system like the GSM system, for example, to enable the mobile station to synchronize to the base transceiver station. The means 1 are thus means routinely provided in a mobile station and will therefore not be described here.

For example, if the mobile is communicating with either of these base transceiver stations (for example the reference base transceiver station, in which case the mobile station is synchronized to that base transceiver station), it listens to the other base transceiver station, in this instance the subordinate base transceiver station, in order to pre-synchronize to the latter ready for a possible handover.

It is then possible to determine in the mobile station, in this instance by the means 2, the time shift $D_1$ between these two base transceiver stations. As the implementation of the means 2 will be obvious to the person skilled in the art, it will not be described in detail here.

The time shift $D_1$ is nevertheless a time shift as seen from the mobile station, and it is therefore necessary to correct it for the propagation time difference $D_2$ between the mobile station and each of the base transceiver stations.

In a TDMA mobile radio system like the GSM system, the propagation time difference is generally calculated on the occasion of a handover, to determine how the timing advance applied to the mobile station in this type of system must be modified. Thus the means 3 are also means routinely provided in a mobile station and will not be described here.

Given the time shifts $D_1$ and $D_2$, subtracting means 4 determine the difference $D_1-D_2$ that constitutes the time shift to be corrected in order to synchronize the subordinate base transceiver station to the reference base transceiver station.

The difference $D_1-D_2$ is calculated in the mobile station, for example. This difference could be transmitted as it stands by the mobile station to the subordinate base transceiver station.

Figure 7:
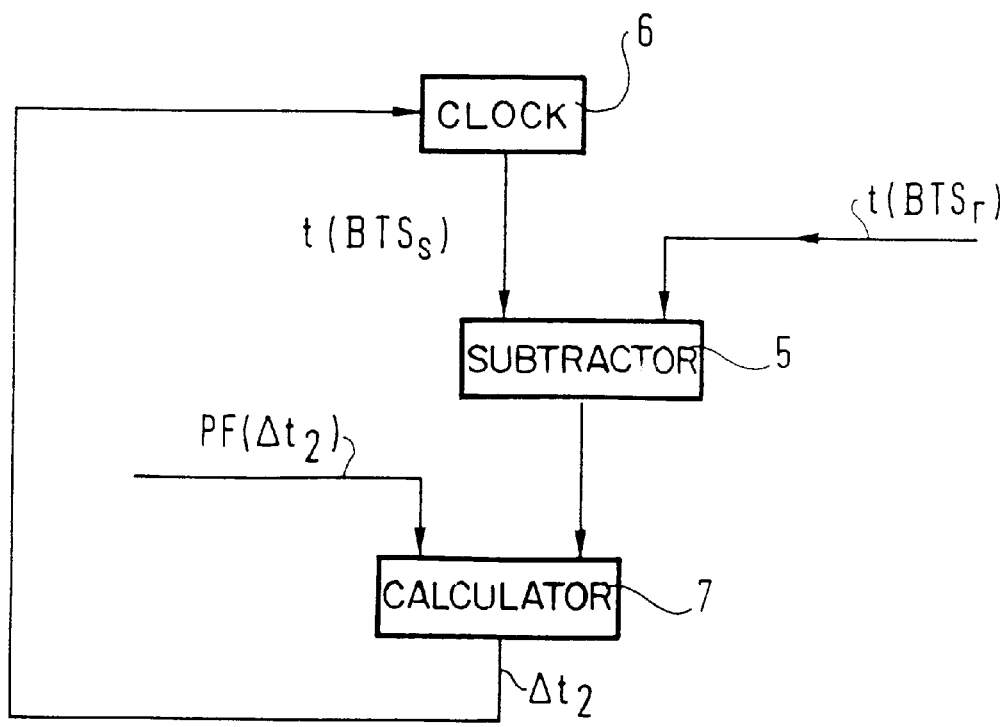
FIG. 7 is a block diagram showing the means employed in a subordinate base transceiver station in one embodiment of a base transceiver station synchronization system of the invention.

In a different embodiment now described with reference to FIG. 7, to avoid consuming too much transmission resource at the air interface between the mobile station and the subordinate base transceiver station the mobile station transmits to the subordinate base transceiver station $BTS_s$ only the fractional part of that difference, which in practise in a system like the GSM system requires only one signalling message M1, rather than several.

In this embodiment, the reference base transceiver station $BTS_r$ transmits the local time $t(BTS_r)$ of the station $BTS_r$ to the subordinate base transceiver station $BTS_s$ at time t in a message $M_2$.

This message $M_2$ reaches the subordinate base transceiver station $BTS_s$ at a time $t(BTS_s)$ such that:

$$t(BTS_s)=t(BTS_r)+\Delta t_1+\Delta t_2$$

where $\Delta t_1$ is the transmission time between the stations $BTS_r$ and $BTS_s$ and $\Delta t_2$ represents the time shift $D_1-D_2$ to be corrected in order for the base transceiver station $BTS_s$ to be synchronized to the base transceiver station $BTS_r$.

For example, if it is assumed that:
$t(BTS_r)=200.1$ s
$\Delta t_1=0.6$ s
$\Delta t_2=150.8$ s
then:

$$t(BTS_s)=200.1+0.6+150.8=351.5\ s$$

In the base transceiver station $BTS_s$, subtractor means 5 receiving the content $t(BTS_r)$ of the message $M_2$ and the local time $t(BTS_s)$ of the base transceiver station $BTS_s$, supplied by a clock 6, deduce that it is advanced by approximately $351.5-200.1=151.4$ s relative to the base transceiver station $BTS_r$ (in this example).

Additionally, the mobile station indicates to the base transceiver station $BTS_s$ in a message $M_1$ the fractional part $PF(\Delta t_2)$ of $\Delta t_2$ which is 0.8 s (in this example).

If it is also assumed (as is in fact the case in a system like the GSM system) that the transmission time $\Delta t_1$ is less than or equal to 0.9 s, then calculation means 7 in the base transceiver station $BTS_s$ deduce the value $\Delta t_2$, which is equal to the largest number ending 0.8 less than 151.4, in this instance 150.8 s.

This value $\Delta t_2$ is applied to a control input of the clock 6, which enables the base transceiver station $BTS_s$ to be synchronized to the base transceiver station $BTS_r$. Accordingly, in the example given, the base transceiver station $BTS_s$ delays its clock by 150.8 s.

Note that although the synchronization of base transceiver stations in accordance with the invention is advantageously achieved by means of a synchronization system of this kind, such synchronization could equally well be obtained with a different synchronization system, or might not be necessary.

There is claimed:
1. A base transceiver station for use in a cellular mobile radio system which includes a plurality of base transceiver stations, said base transceiver station comprising:
   a first transmitter transmitting a TDMA traffic frame adapted to be received by cellular mobile radio stations, said first transmitter transmitting said TDMA traffic frame at a current frequency of a plurality of frequencies defined in a frequency hopping re-use pattern;
   a second transmitter transmitting a TDMA control frame adapted to be received by cellular mobile radio stations, said second transmitter transmitting said TDMA control frame at another frequency of said plurality of frequencies defined in said frequency hopping re-use pattern;

means for stopping all sending by said first transmitter during a part of said TDMA traffic frame, said first transmitter sending traffic during only another part of said TDMA traffic frame;

said part of said TDMA traffic frame having a duration equal to or greater than a duration of a relative synchronization error between said base transceiver station and another of said plurality of base transceiver stations in said cellular mobile radio system.

2. The base transceiver station as claimed in claim 1, wherein said part of said TDMA traffic frame is a first time slot of said TDMA traffic frame.

3. The base transceiver station as claimed in claim 2, further comprising said second transmitter sending data on a first time slot of said TDMA control frame so as to form a common channel, said TDMA control frame being continuously transmitted on a BCCH frequency.

4. The base transceiver station as claimed in claim 3, further comprising said second transmitter sending dummy bursts during said TDMA control frame except during said first time slot of said TDMA control frame.

* * * * *